(12) United States Patent
Welch et al.

(10) Patent No.: US 8,458,198 B1
(45) Date of Patent: *Jun. 4, 2013

(54) DOCUMENT ANALYSIS AND MULTI-WORD TERM DETECTOR

(75) Inventors: Michael J. Welch, Los Angeles, CA (US); Walter W. Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,821

(22) Filed: Dec. 5, 2011

Related U.S. Application Data

(63) Continuation of application No. 11/946,637, filed on Nov. 28, 2007, now Pat. No. 8,090,724.

(51) Int. Cl.
 *G06F 17/30* (2006.01)
(52) U.S. Cl.
 USPC .......................... 707/750; 707/797; 707/917
(58) Field of Classification Search
 USPC ........................................ 707/750, 797, 917
 See application file for complete search history.

(56) References Cited

U.S. PATENT DOCUMENTS

| | | | |
|---|---|---|---|
| 5,704,060 A | 12/1997 | Del Monte | |
| 5,794,177 A | 8/1998 | Carus et al. | |
| 5,850,520 A | 12/1998 | Griebenow et al. | |
| 5,937,392 A | 8/1999 | Alberts | |
| 5,948,061 A | 9/1999 | Merriman et al. | |
| 6,009,410 A | 12/1999 | Lemole et al. | |
| 6,014,502 A | 1/2000 | Moraes | |
| 6,134,532 A | 10/2000 | Lazarus et al. | |
| 6,154,737 A | 11/2000 | Inaba et al. | |
| 6,173,045 B1 | 1/2001 | Smith | |
| 6,243,104 B1 | 6/2001 | Murray | |
| 6,297,824 B1 | 10/2001 | Hearst et al. | |
| 6,314,451 B1 | 11/2001 | Landsman et al. | |
| 7,849,081 B1 | 12/2010 | Chang et al. | |
| 8,060,506 B1 | 11/2011 | Chang et al. | |
| 8,090,724 B1 * | 1/2012 | Welch et al. | ................ 707/750 |
| 2002/0188532 A1 | 12/2002 | Rothstein | |
| 2004/0181525 A1 | 9/2004 | Itzhak et al. | |

(Continued)

OTHER PUBLICATIONS

Swaine, Michael, "Shhh! Online Libraries", Net Traveler, v11, n12, p. 155, Dec. 1995.

(Continued)

*Primary Examiner* — Cheryl Lewis
(74) *Attorney, Agent, or Firm* — Kilpatrick Townsend & Stockton LLP

(57) ABSTRACT

A term analyzer receives an ordered collection of text-based terms. The term analyzer analyzes groupings of consecutive text-based terms in the ordered collection to identify occurrences of different combinations of text-based terms. In addition, the term analyzer maintains frequency information representing the occurrences of the different combinations of text-based terms in the collection. The frequency information can then be used to determine relatively significant keywords and/or keyword phrases in the document. In an example configuration, the term analyzer creates a tree in which a first term in a given grouping of the groupings is defined as a parent node in the tree and a second term in the given grouping is defined as a child node of the parent node in the tree. The method of the analyzer generalizes to create a tree of multi-word terms in which the terms can be efficiently ranked by occurrence.

20 Claims, 12 Drawing Sheets

U.S. PATENT DOCUMENTS

| | | | |
|---|---|---|---|
| 2005/0091106 | A1 | 4/2005 | Reller et al. |
| 2005/0192792 | A1 | 9/2005 | Carus et al. |
| 2005/0229258 | A1 | 10/2005 | Pigin |
| 2007/0027671 | A1 | 2/2007 | Kanawa |
| 2007/0074270 | A1 | 3/2007 | Meehan et al. |
| 2007/0174267 | A1 | 7/2007 | Patterson et al. |
| 2007/0198344 | A1 | 8/2007 | Collison et al. |
| 2008/0086779 | A1 | 4/2008 | Blake et al. |
| 2008/0147638 | A1 | 6/2008 | Hoeber et al. |

OTHER PUBLICATIONS

E-Book Systems, Inc., Flipbrowser-3D page-flipping web brow . . . bmaster, internet, free download trial, www.dlipbrowser.com/home. php, p. 1-3, copyright 1998-2001, E-Books Systems, Inc., Santa Clara, CA.

Bell Atlantic Launches Interactive Yellow Pages on Web (Bell Atlantic Interactive launched Yellow Pages directory on World Wide Web; Internet Guide to be in traditional Yellow Pages directories), Newsbytes News Network, p. N/A, p. 1-2, Feb. 12, 1997, Journal (United States).

U.S. Appl. No. 11/946,680 Non-Final Office Action dated Jul. 20, 2010.

U.S. Appl. No. 11/946,671 Notice of Allowance dated Aug. 2, 2010.

U.S. Appl. No. 11/728,069 Non-Final Office Action dated Sep. 22, 2010.

U.S. Appl. No. 11/946,680 Response to Non-Final Office Action dated Oct. 20, 2010.

U.S. Appl. No. 11/728,069 Response to Non-Final Office Action dated Dec. 22, 2010.

U.S. Appl. No. 11/946,680 Notice of Non-Compliant Amendment dated Dec. 23, 2010.

U.S. Appl. No. 11/946,680 Response to Notice of Non-Compliant Amendment dated Jan. 13, 2011.

U.S. Appl. No. 12/917,505 Notice of Allowance dated Feb. 23, 2011.

U.S. Appl. No. 11/728,069 Final Office Action dated Mar. 17, 2011.

U.S. Appl. No. 11/946,680 Final Office Action dated Mar. 28, 2011.

U.S. Appl. No. 12/917,505 Request for Continued Examination dated May 20, 2011.

U.S. Appl. No. 11/728,069 Notice of Appeal dated Jun. 17, 2011.

U.S. Appl. No. 12/917,505 Notice of Allowance dated Jun. 24, 2011.

U.S. Appl. No. 11/946,680 Notice of Appeal dated Jun. 30, 2011.

U.S. Appl. No. 11/946,680 Notice of Allowance dated Oct. 24, 2011.

\* cited by examiner

DOCUMENT ANALYSIS AND MULTI-WORD TERM DETECTOR

RELATED APPLICATIONS

This application is related to U.S. patent application Ser. No. 11/946,680 entitled "GENERATION AND PROCESSING OF NUMERICAL IDENTIFIERS," filed on Nov. 28, 2007, now allowed, the contents of which are incorporated herein by reference.

This application is related to U.S. patent application Ser. No. 11/946,671 entitled "DOCUMENT ANALYZER AND METADATA GENERATION AND USE," filed on Nov. 28, 2007, now U.S. Pat. No. 7,849,081, the contents of which are incorporated herein by reference.

BACKGROUND

The Internet has created a proliferation of searchable content by providing access to millions, if not billions, of Web pages, documents, and other similar published content. To augment the searchability of such content, conventional document processing algorithms have been developed to automatically determine relevant keywords embedded in digitized documents.

In its most basic form, conventional document processing algorithms can measure the frequencies in which words or terms appear in a given document. Those words or terms having higher frequencies can theoretically have, to a certain degree, greater relevance or significance when classifying content in a particular document.

A more sophisticated method for keyword extraction involves the use of conventional Part-Of-Speech "POS" taggers. Conventional POS taggers are capable of identifying multi-word phrases by determining the part of speech for a particular term (e.g., verb, noun, adjective, etc.) and then, based on grammatical and syntactical statistical models, determining which word groupings (e.g., adjective-noun, noun-noun, etc.) are grammatically correct. The groupings can be analyzed to calculate corresponding frequencies of occurrence for those groupings in a given document.

The extraction of keywords by conventional document processing algorithms has several applications such as, for example, use in targeted advertising, tagging of documents in online social environments, database development, and other similar document cataloguing or classification endeavors. For example, a document analyzer can identify an essence of a document and apply keywords to the document so that an advertiser can distribute appropriate advertisements along with the document when downloaded by a computer user.

SUMMARY

Conventional techniques for determining relevant terms and, more particularly, relevant phrases in a document suffer from a variety of deficiencies. For instance, one example deficiency is that such conventional techniques are inflexible when it comes to determining the frequencies of occurrence for multi-word terms of varying length in a document. In conventional systems, such processing cannot be performed without specifying a particular phrase to search for, or without being subject to the grammatical or syntactical constraints applied by POS tagger algorithms.

Techniques discussed herein deviate with respect to conventional applications such as those discussed above. For example, embodiments disclosed herein provide an efficient method of finding multi-term phrases of varying length within a document using an n-gram tree (or word suffix-tree) algorithm and data structure.

More specifically, a term analyzer (e.g., n-gram tree algorithm) is able to determine the frequencies in which different sized multi-word phrases occur in a given document. In doing so, embodiments herein are capable of determining which phrases (of up to n-words in length) actually appear in a document as well as which phrases occur more frequently than others in a document and, thus, are more relevant. Stated differently, such embodiments can filter "noise" or non-relevant phrases The term analyzer can provide a ranking of phrases, typically by frequency, so that another application or program can use those phrases to appropriate classify a given document. It should be appreciated that the ranking of phrases is potentially non-discriminatory with respect to phrase length. For example, phrases of varying length can be included in the same ranking schema.

In addition to frequency statistics (e.g., counts representing occurrence of terms), a term analyzer also can maintain positional data with respect to each phrase. The positional data pertains to the locations in a document in which occurrences of a given phrase can be found. With the frequency statistics, the positional data further enables the term analyzer to more accurately select keywords and phrases that have a greater relative significance in a document. For example, a single or multi-word phrase appearing throughout a range of a whole document may be more important than a single or multi-word phrase that appears often but only in a single limited range of the document.

What's more, embodiments herein increase automation by minimizing the number of preset parameters necessary for processing. For example, only 'n', the upper limit for the word-size of a given searchable phrase, can be defined prior to execution in accordance with one configuration. Accordingly, an analyzer can be configured to identify occurrences of phrases of a particular length such as 2 words, 3 words, etc.

A frequency threshold value may also be established to filter out phrases that do not occur with enough frequency in the document. For example, in one example embodiment, a separate frequency threshold value can be established for each phrase. Thus, for a 3-gram tree (e.g., n=3) where phrases having 1, 2 or 3 words are searched, a separate frequency threshold value can be established for occurrences of 1-word phrases, 2-word phrases, and 3-word phrases and classifying such terms as keywords.

More specifically, embodiments disclosed herein provide a term analyzer that receives an ordered collection of text-based terms. For example, the ordered collection can contain terms from a document that have been filtered to remove "noise" such as stopwords. The term analyzer analyzes groupings of consecutive text-based terms in the ordered collection to identify occurrences of different combinations of text-based terms in the ordered collection.

In addition, the term analyzer maintains frequency information representing the occurrences of the different combinations of text-based terms in the collection. The frequency information can then be used to determine relatively significant keywords and/or themes in the document.

According to an example configuration, the term analyzer creates a tree in which a first term in a given grouping of the groupings is defined as a parent node in the tree and a second term in the given grouping is defined as a child node of the parent node in the tree. In such a configuration, the term analyzer creates the tree such that the parent node represents a first word and the child node represents a second word.

Further, a combination of the parent node and the child node can represent a phrase including the first word and the second word.

For each occurrence of a root term (e.g., stem or stemmed term) in the ordered collection, the term analyzer can maintain positional data for any text-based terms that are associated with that root term. For example, consider the root or stem term "engineer" that is associated with the set of terms: {"engineering", "engineered", "engineers", etc.}. In such an example, the term analyzer maintains positional data (e.g., pointers) for the root term with respect to the set of terms (or each term separately therein). Generally, the positional data indicates a relative position in the ordered collection for each of the text-based terms. In other embodiments, the analyzer can maintain positional information for the non-root terms if so desired.

These and other embodiments will be discussed in more detail below.

Note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to include a term analyzer and/or related functions as explained herein to carry out different embodiments of the invention.

Yet other embodiments herein include software programs to perform the steps and operations summarized above and disclosed in detail below. One such embodiment comprises a computer program product that has a computer-readable medium (e.g., a tangible computer readable media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as analyzing document for occurrences of single and multi-word terms using a novel word grouping method such as a sliding window and a word tree. The instructions, and thus method as described herein, when carried out by a processor of a respective computer device, cause the processor to: i) receive an ordered collection of text-based terms; ii) analyze groupings of consecutive text-based terms in the ordered collection to identify occurrences of different combinations of text-based terms in the ordered collection; and iii) maintain frequency information representing the occurrences of the different combinations of text-based terms in the collection. The numbering of the previous steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or within a software application. Example embodiments of the invention may be implemented within products and/or software applications such as those manufactured by Adobe Systems Incorporated of San Jose, Calif., USA.

As discussed above, techniques herein are well suited for use in software applications implementing term and phrase analysis and/or keyword generation with respect to documents having textual-based terms. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Embodiments herein provide an efficient method for finding multi-term phrases of varying length within a document using a novel n-gram tree (or word suffix-tree) algorithm and data structure. In particular, the n-gram tree algorithm can be used to determine the frequencies in which phrases of varying length (up to a length of 'n' words) occur in a given document. By doing so, embodiments herein are capable of determining which phrases (of up to n-words in length) occur more frequently than others in a document and, therefore, are more relevant for possible use as keywords to describe an essence of the document.

Figure 1:
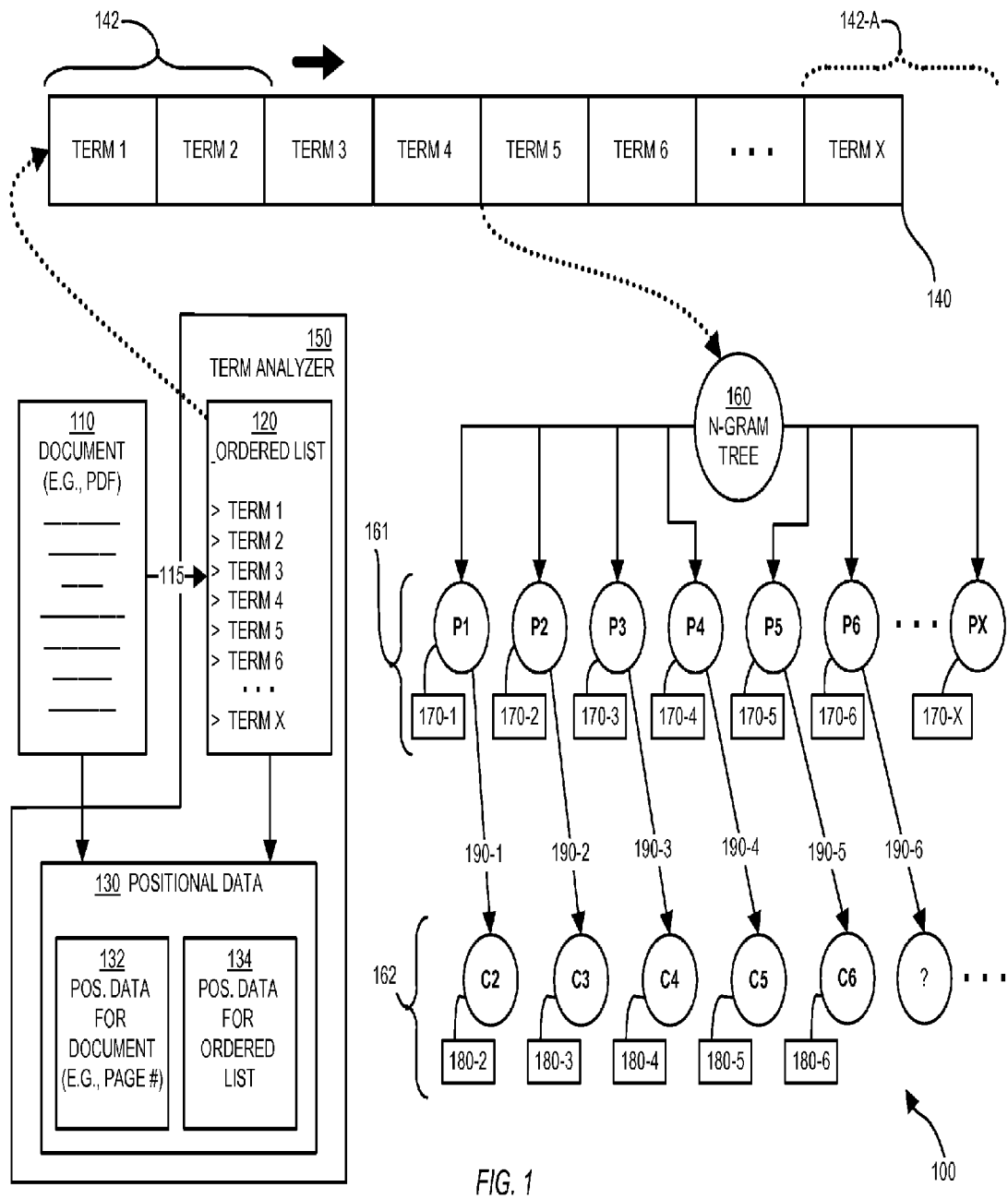
FIG. 1 is an example diagram of a processing environment supporting analysis of terms and phrases in a document according to embodiments herein.

FIG. 1 is an example block diagram of a processing environment 100 including a document 110 (e.g., in a Portable Document Format "PDF", a WORD™ document, an e-mail, a web page, database information, file, etc.), term analyzer 150, ordered list 120, positional data 130 that includes positional data for the document 132 and positional data for the ordered list 134, document vector 140 and n-gram tree 160. Ordered list 120 contains the set of terms having a respective ordering {Term 1, Term 2, Term 3, Term 4, Term 5, Term 6, . . . , Term X} as derived from document 110. Accordingly, the document vector 140 also contains the set of terms having a respective ordering {Term 1, Term 2, Term 3, Term 4, Term 5, Term 6, . . . , Term X}.

Each term in the ordered list 120 can represent a single word or multi-word phrase, a text-based string, etc.

A sliding window 142 (e.g., a two term window also referred to as a 2-gram or bigram in FIG. 1) is shown initially creating a window including Term 1 and Term 2 in document vector 140. Note that the sliding window 142 can have a term length of 1 or greater, up to the total number of terms in a given document vector. In this example, n=2, meaning that the sliding window 142 encompasses two terms at a time as it slides towards term X. The first term (e.g., Term 1) in the sliding window 142 becomes a parent node of tree 160 if one does not yet exist at the parent level for the term. The second term (e.g., Term 2) in the sliding window 142 becomes a child node of tree 160 for the parent node. Derivation of the n-gram will be discussed in more detail below.

Further note that the sliding window 142, as shown in this particular configuration, advances (or slides) across consecutive terms in the document vector 140 starting at the seminal term, Term 1, through the last term, Term X when analyzing document vector 140 to create tree 160 as discussed below.

N-gram tree 160 has a parent level 161 and a child level 162 having respective parent nodes (e.g., P1, P2, P3, . . . ) and child nodes (C1, C2, C3, . . . ). Note that parent node P1 corresponds to Term 1, parent node P2 and child node C2 correspond to Term 2, parent node P3 and child node C3 correspond to Term 3, and so on.

Each parent node has an associated data set 170 (e.g., data set 170-1 being associated with parent node P1, data set 170-2 being associated with parent node P2, and so on). Similarly, each child node has an associated data set 180 (e.g., data set 180-2 being associated with child node C2, data set 180-3 being associated with child node C3, and so on).

As will be discussed below with respect to FIGS. 5 and 6, parent data sets 170 and child data sets 180 can include information such as, by way of non-limiting example, positional information (e.g., offset, page number, etc.), pointer references to other nodes in the n-gram tree 160, pointer references to stem terms, frequency of occurrence information, etc.

As shown in FIG. 1, parent node P1 has a pointer 190-1 to child node C2, parent node P2 has a pointer 190-2 to child node C3, parent node P3 has a pointer 190-3 to child node C4, parent node P4 has a pointer 190-4 to child node C5, and parent node P5 has a pointer 190-5 to child node C6.

During general operation, the term analyzer 150 performs pre-processing 115 on document 110 in order to generate ordered list 120. Pre-processing may include processing such as tokenization of terms, filtering stopwords, finding stem or root terms, etc. The term analyzer 150 also extracts positional data 132 for the terms in the document. The positional data 132 for terms in the document may include, for example, an offset position for each term with respect to a reference point (e.g., the first term) in the document 110, the particular page number in which a given term is located, etc.

By filtering stopwords (e.g., terms with relatively little relevance or uniqueness with respect to other terms in a document, such as "the" or "of"), the term analyzer generates an ordered list 120 of terms for analysis via the n-gram tree 160. Similar to the discussion above, the term analyzer 150 also extracts positional data 134 for terms in the ordered list 120 that may include, for example, an offset position for each term with respect to a reference point (e.g., the first term) in the ordered list 120.

Note that in one example embodiment the ordered list 120 and the document vector 140 are one in the same or are closely correlated. In other words, an ordering of the terms in the document 110 can be retained so that terms in the ordered list 120 correspond to a same relative position of the original terms as they appear in the document 110.

Since the example configuration of FIG. 1 shows a 2-gram (or bigram) size window, the n-gram tree 160 has a parent level and one corresponding child level. It should be noted, however, that the n-gram tree may have many child levels hierarchically configured with respect to one another. Generally, the number of child levels is "n−1", where 'n' is the n-gram tree size 160 and or the size of sliding window 142. For example, a 4-gram tree would include a sliding window having a term width of 4, 1 parent level, and 3 hierarchical child levels beneath the one parent level.

According to an example embodiment, in creating a parent node for the n-gram tree 160, the term analyzer 150 takes a term occupying a first position in the sliding window 142 that has the lowest ordinal value of the terms being indicated by the sliding window 142. As shown in FIG. 1, the term occupying the first position in the sliding window 142 and having the lowest ordinal value is Term 1. Consequently, Term 1 is represented as parent node P1 in n-gram tree 160.

Next, the term analyzer 150 takes the term occupying a position in the sliding window 142 that immediately follows the previously analyzed term (i.e., Term 1). In furtherance of the example above, the term occupying the position immediately following the first position in the sliding window is Term 2. Thus, the term analyzer 150 creates a child node C2 corresponding to Term 2 and subordinate to its parent node P1. A combination of the P1-C2 branch of n-gram tree 160 now represents at least one occurrence of the phrase (or bigram) "Term 1-Term 2" in the ordered list 120.

Note that when a child node is created for (is subordinate to) a given parent node, the term analyzer 150 provides the given parent node with a pointer to the child node. For instance, parent node P1 has a pointer 190-1 that references corresponding child node C2.

Upon completing the analysis for each term in a given sliding window position, the term analyzer 150 advances the sliding window 142 across the document vector 140 by one term. Thus, in referring to the example of FIG. 1, the sliding window 142 would slide to the right by one term and subsequently indicate Term 2 and Term 3 as a combination in sliding window 142 in the next iteration of the n-gram tree 160 processing.

For example, while the sliding window 142 includes Term 2 and Term 3 of document vector 140, the term analyzer 150 creates the P2-C3 branch in n-gram tree 160. For example, term 2 is distinct from term 3 and thus P2 is created for representing term 2. The term analyzer 150 iteratively continues sliding the window and creating the tree 160 until the term occupying the first position (or having the lowest ordinal value) in the sliding window 142 indicates the last term in the document vector. Sliding window 142-A represents this final position of the sliding window for the n-gram tree analysis.

As will be discussed in more detail below with respect to FIG. 6, each parent and child node maintains a frequency of occurrence for their corresponding term in the document vector 142. For example, if parent node P2 (e.g., term 2) has a frequency of occurrence of 7, then "Term 2" occurs as a 1-gram (or unigram) 7 separate times throughout the document vector 142 and/or ordered list 120. Similarly, if child node C3 (e.g., term 3) has a frequency of occurrence of 5, then "Term 2-Term 3" (as indicated by branch P2-C3) occurs as a 2-gram (or bigram) phrase 5 separate times throughout the document vector 142 and/or ordered list 120.

As another example, consider a 3-gram tree having a sliding window with a term width of 3. Such a 3-gram tree would have a parent level, a first child level, and a second child level subordinate to the first child level. Assume, for this example, that the sliding window (of width 3) indicates Term 1, Term 2 and Term 3 in FIG. 1. The processing of Term 1 and Term 2 of the 3-gram tree would be similar to that of the 2-gram tree discussed above such that the term analyzer 150 creates a corresponding parent node P1 for Term 1 and a corresponding child node C2 for Term 1. In processing Term 3, the term analyzer 150 would create a child node C3 subordinate to the child node C2. As a result, the 3-gram tree branch P1-C2-C3 would represent at least one occurrence of the phrase (or trigram) "Term 1-Term 2-Term 3" in the document vector 140. Processing of the 3-gram tree in this manner is akin to a depth-first technique for traversing nodes in a tree.

It should be noted that the methods and techniques for creating an n-gram tree as discussed above are meant for purposes of example only.

As discussed, the above discussion is only a preliminary description indicating how to create tree 160. Additional details of n-gram tree generation are discussed in greater detail below with respect to FIG. 6.

Figure 2:
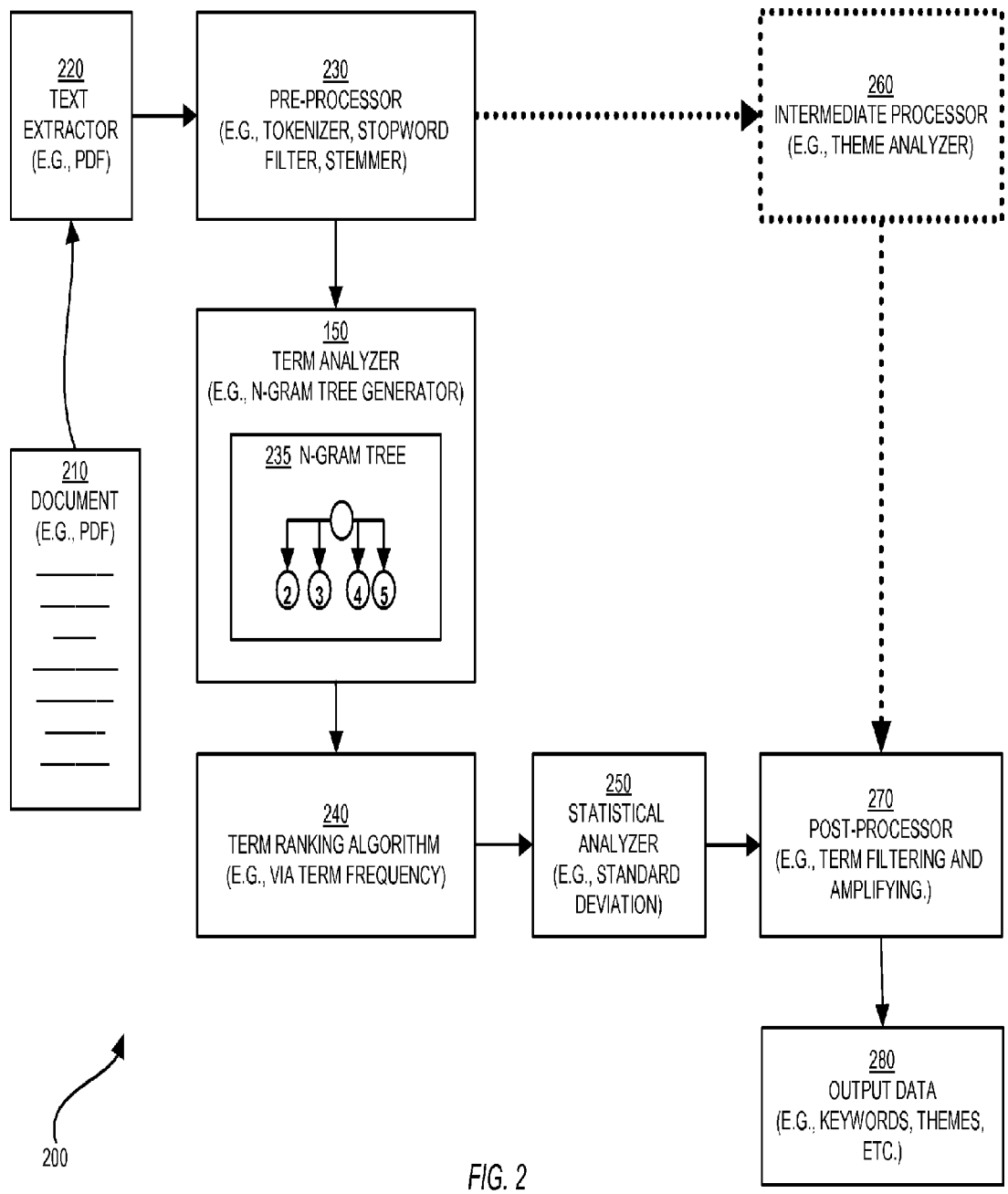
FIG. 2 is an example diagram of a processing environment supporting term processing and keyword extraction according to embodiments herein.

FIG. 2 is an example block diagram of a processing environment 200 including a collection of terms (e.g., a document 210) text extractor 220, pre-processor 230, term analyzer 150, n-gram tree 235, term ranking algorithm 240, statistical analyzer 250, intermediate processor 260, post-processor 270, and output data 280 (e.g., metadata associated with document 210).

The example embodiment of FIG. 2 represents a particular implementation of the term analyzer 150 for performing keyword extraction and keyphrase extraction on a document.

In the context of the present example, as its name suggests, the text extractor 220 extracts text-based terms from document 210 (e.g., terms such as character strings separated by white space). The pre-processor then performs various analyses and filtering of the extracted terms such as tokenization, stop word filtering, filtering of insignificant tokens that constitute undesired text, stemming of terms into roots, etc.

Note that "term" as described herein can encompass any element designated for representing something. Use of text-based terms as described herein is for illustrative purposes only.

In one embodiment, the term analyzer 150 receives an ordered list of terms from the pre-processor 230. The ordered list (of terms) is generated by pre-processor 230.

With this ordered list, the term analyzer 150 creates n-gram tree 235 as previously discussed. The term ranking algorithm 240 uses the n-gram tree 235 to rank terms and phrases according to their corresponding frequencies of occurrence in document 210. As such, the terms and phrases having higher frequencies of occurrence theoretically represent more relevant and/or distinguishing content in document 210.

One purpose of the tree 235 is to quickly identify single words terms and multi-word terms that are relevant to the document 210. This can be achieved by analyzing count values for parent nodes and child nodes. For example, if a child node has a high count value, this indicates that the combination of terms for a phrase represented by a corresponding combination of the parent and child term appear often in the document and that such a combination of terms may be a relevant keyphrase associated with the document. If the count value for a child node is low, this indicates that a corresponding combination of the parent and child term do not appear often in the document and that such a combination of terms is less likely to be a useful keyphrase to associate with the document.

In one embodiment, the term ranking algorithm 240 utilizes the count information (e.g., frequency information) for parent and child nodes as discussed above to select single word phrases and multi-word phrases that are more likely to represent an essence of document 210.

The statistical analyzer 250 uses the term ranking information and corresponding positional data to perform various distribution-based analyses (e.g., mean offset calculations, offset standard deviation calculations, etc.) on the n-gram terms and phrases. For example, the statistical analyzer 250 can analyze the top or most highly ranked terms and phrases (from the term ranking derived by algorithm 240) above one or more predetermined frequency threshold values.

During its analysis, the statistical analyzer 250 uses the offset or ordinal position of each unique term or phrase (or the stemmed equivalents) to determine how those terms and phrases are distributed throughout the document 210 and any focal areas where those terms and phrases occur with higher frequency. The statistical analysis, as a result, provides an updated ranking of terms (e.g., by relevance) with respect to the location and distribution of the terms and phrases in the document 210. In other words, two text-based strings may both occur at a relatively high term frequency. However, one term may appear only in a single small section of the document 210. The other text-based string may be present throughout a range of the document. In such an instance, the text-based string occurring throughout the range is ranked higher because it more likely is representative of an essence of the document 210 as a whole than does the term that appear in the small section.

A more detailed discussion corresponding to FIG. 2 can be found in related U.S. patent application Ser. No. 11/946,671 entitled "DOCUMENT ANALYZER AND METADATA GENERATION", filed on Nov. 28, 2007, now U.S. Pat. No. 7,849,081, the entire teachings of which are incorporated herein by this reference.

Note that, although shown as a separate entity, the term analyzer 150 can also include processing functionality as performed by text extractor 220, pre-processor 230, term ranking algorithm 240 and/or statistical analyzer 250.

Intermediate processor 260 receives the pre-processed terms as input and performs various analyses on those terms. For example, intermediate processor 260 can perform theme analysis on the pre-processed terms to determine theme keywords, related topic categories and/or thematic summaries associated with document 210.

Post-processor 270 combines the results of the statistical analyzer 250 and the intermediate processor 260 to further refine the list keyword terms, phrases and/or categories that most accurately describe the content of document 210. In other words, post-processor 270 can filter out less significant keywords and/or phrases while amplifying more relevant and impactful terms and/or phrases commensurate with document 210. Such a listing of keywords, phrases, themes, etc., is provided in output data 280 (e.g., as metadata) and can be used by other programs (e.g., targeted advertisement aggregators) to classify and pinpoint content associated with document 210.

A more detailed discussion of the statistical analyzer can be found in related U.S. patent application Ser. No. 11/728,069 filed on Mar. 23, 2007, entitled "Method and Apparatus For Performing Targeted Advertising in Documents," the entire teachings of which are incorporated herein by this reference.

Figure 3:
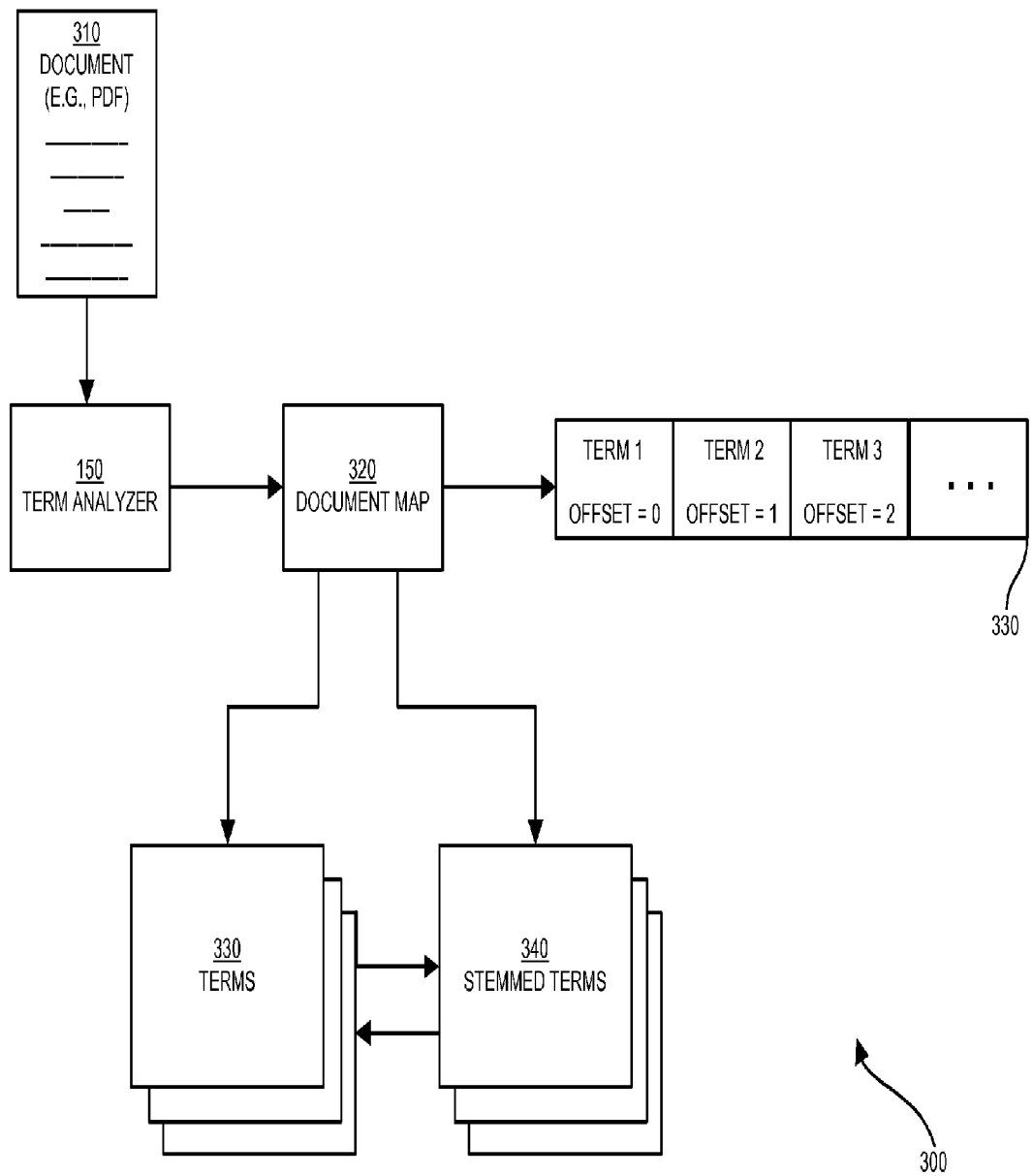
FIG. 3 is an example diagram illustrating mapping of terms in a document according to embodiments herein.

FIG. 3 is an example block diagram of a processing environment 300 including a term analyzer 150, document 310 (e.g., PDF), document map 320, document vector 330, terms 330, and stemmed terms 340.

Term analyzer 150 creates a document map 320 to identify all terms and a corresponding stem term of those terms, if any, in the document's text. As previously mentioned, the stem form of a term is a root term common among other similar terms. For example, "engin" is the stem term for "engineering", "engineered", "engineers", etc.

Having identified each term in the text of document 310, the term analyzer 150 sequentially indexes the terms into the linear document vector 330. Note that each term has a corresponding offset value to a reference point. The reference point in this particular example is the first position in the document vector. Thus, Term 1 has an offset of 0, Term 2 has an offset of 1, Term 3 has an offset of 2, and so on.

Figure 4:
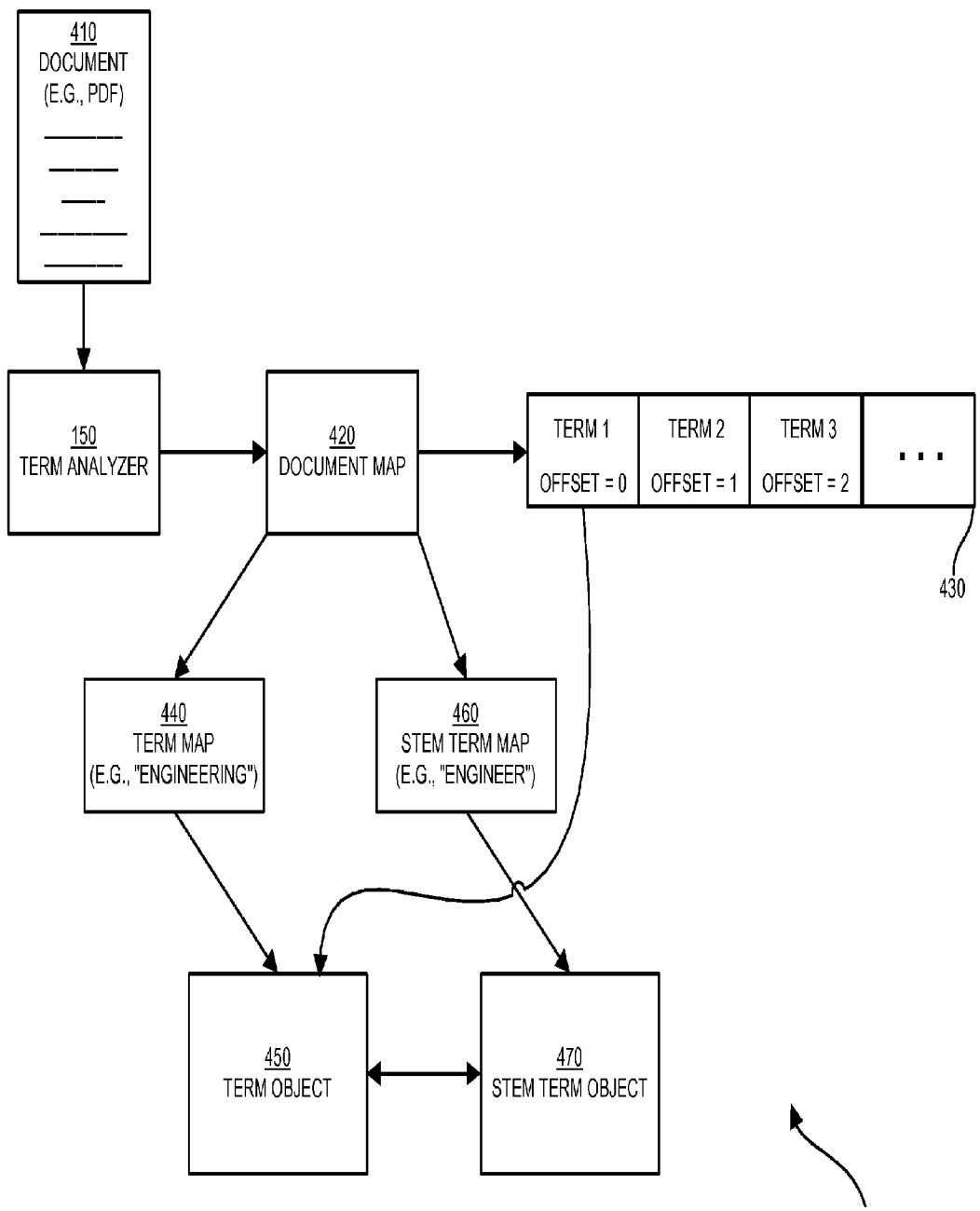
FIG. 4 is an example diagram illustrating mapping of document terms according to embodiments herein.

FIG. 4 is an example block diagram of a processing environment 400 including a term analyzer 150, document 410 (e.g., PDF), document map 420, document vector 430, text-to-term map 440 for associated term object 450, and text-to-stem term map 460 for associated stem term object 470.

In this example configuration, the term analyzer 150 creates a text-to-term map 440 for all unique words in the document vector 430. For instance, suppose that document 410 contains many instances of the word "engineering". The term analyzer 150 can create a single term object 450 (e.g., an instantiation of an object having related data and attributes) that references each occurrences of the word "engineering" in the document vector 430 (e.g., via pointers or offset information).

Further assume that document 410 has multiple instances of the words "engineers", "engineering" and "engineered". In one embodiment, the term analyzer 150 creates a single stem term object 470 (e.g., an instantiation of an object having related data and attributes) for the common root "engineer" that references each occurrence of the words "engineers", "engineering" and "engineered" in the document vector 430 (e.g., via pointers or offset information).

Figure 5:
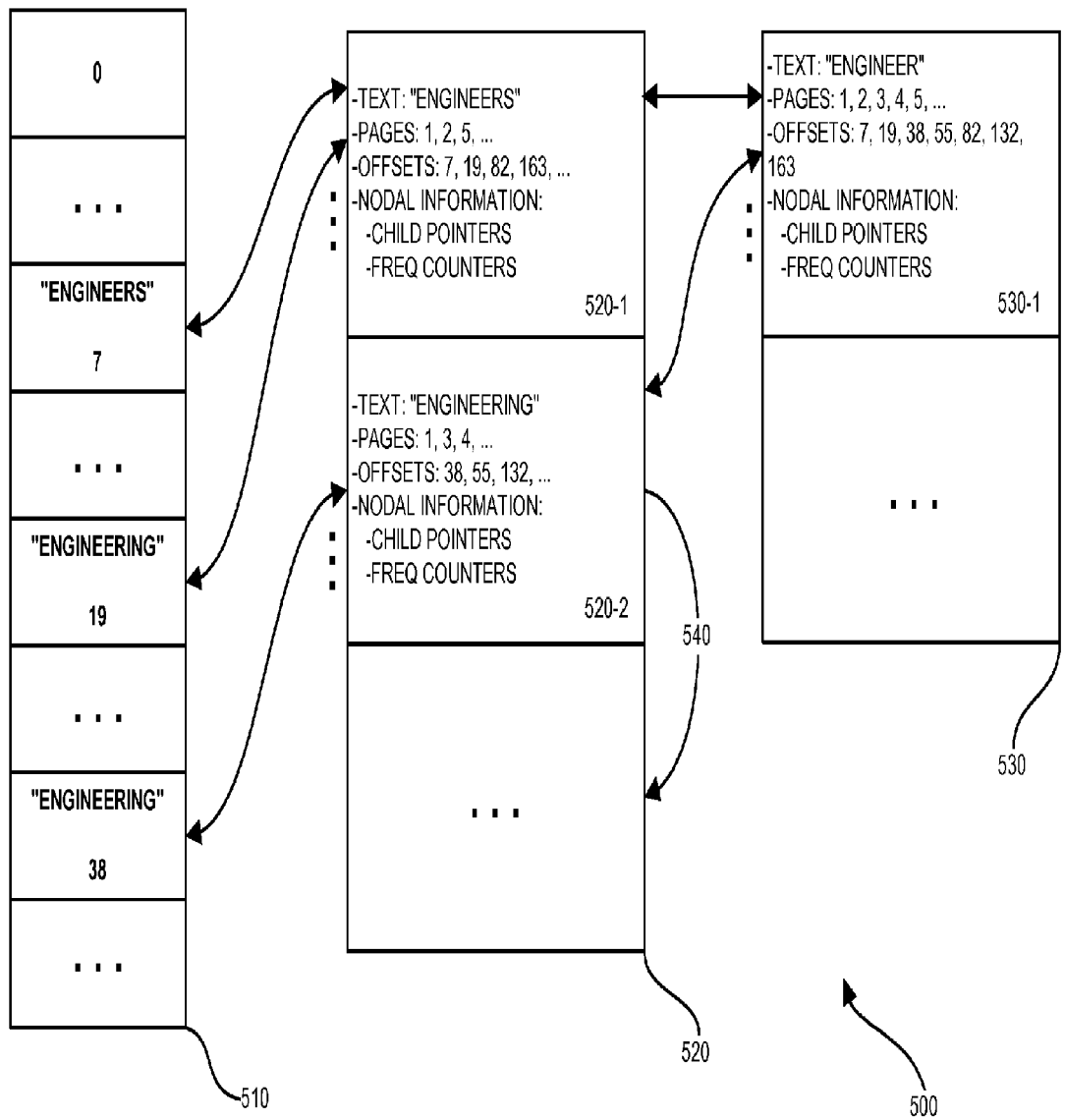
FIG. 5 is an example diagram of a processing environment supporting analysis of terms and phrases in a document according to embodiments herein.

FIG. 5 is an example block diagram of a processing environment 500 including a document vector 510, term objects 520 and stem term objects 530.

In the example configuration of FIG. 5, note that a single term object 520-1 has been created for multiple occurrences of the unique term "engineers" in document vector 510. Note that the term object 520-1 contains offset information referencing each instance of "engineers" in the document vector 510 (e.g., offsets=7, 19, . . . ). Similarly, term object 520-2 references multiple occurrences of the unique term "engineering" in document vector 510. Accordingly, term object 520-2 contains offset information referencing each instance of "engineering" in the document vector 510 (e.g., offsets=38, . . . ).

Term objects 520 can also include other information useful for n-gram tree generation such as, for example, corresponding page number in a document, offset information for a term in a document (as compared to offset information for the term in the document vector), nodal information pertaining to parent and child nodes of an n-gram tree, etc. Nodal information can include pointers to child nodes (e.g., pointer 540 to another term object that is a child node of the term "engineering"), a frequency counter associated with each instance that a given term object is a child node of another term object (e.g., parent node or higher-order child node), etc. For example, if term object 520-1 is a child node for term object 520-2 and also a child node for another term object, then term object 520-1 would have separate frequency counters for each respective term object to which term object 520-1 is a child node.

FIG. 5 also shows stem term object 530-1 ("engineer) associated with term object 520-1 ("engineers") and term object 520-2 ("engineering"). Similar to term objects 520, stem term object 530-1 contains various useful information such as, for example, document vector offsets, document offsets, document page numbers, nodal information (e.g., child pointers and frequency counters), etc.

Figure 6:
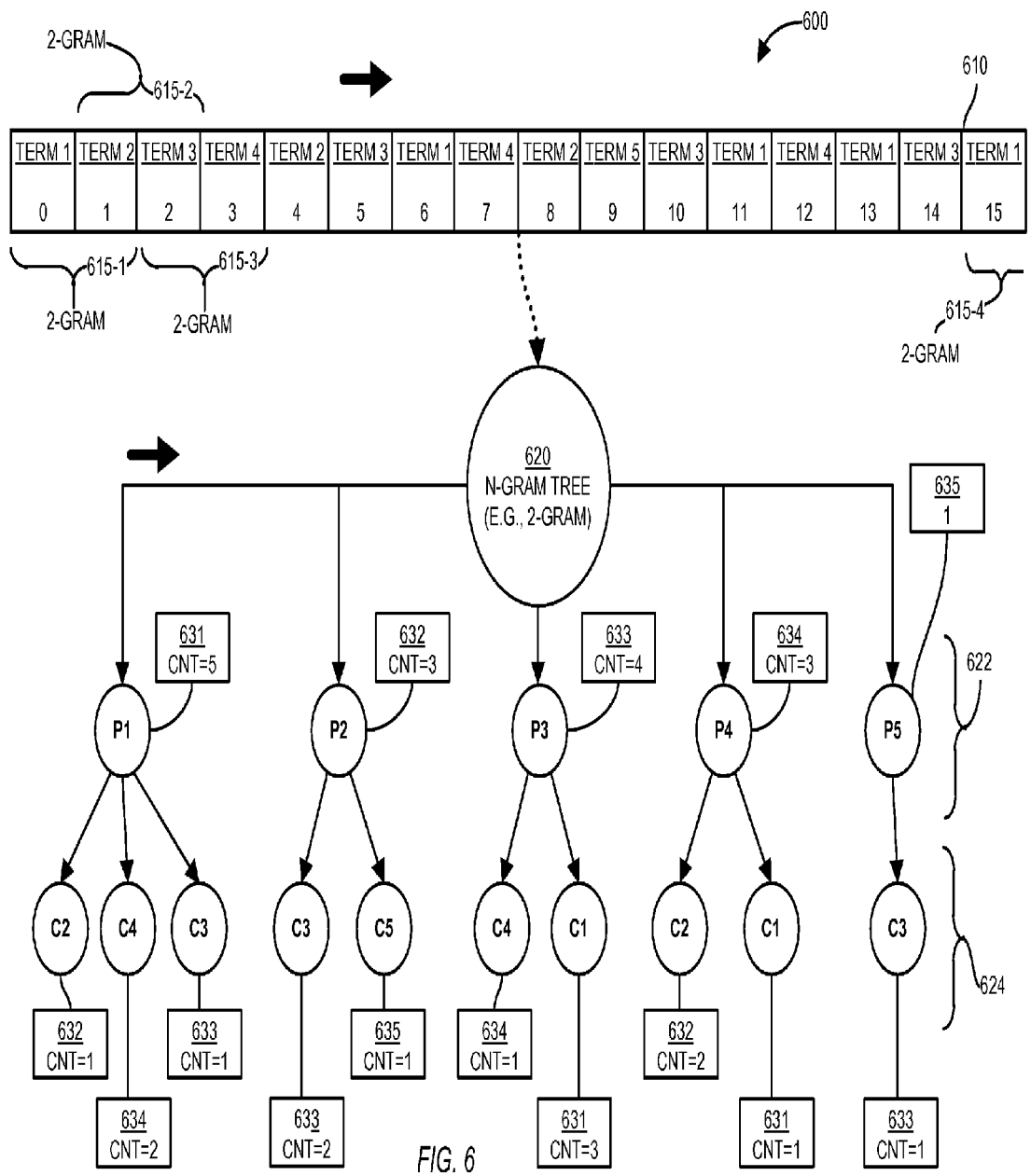
FIG. 6 is an example diagram of a processing environment supporting generation of an n-gram tree according to embodiments herein.

FIG. 6 is an example block diagram of a processing environment 600 including a document vector 610 and associated sliding window 611 located at different sliding window positions 611-1, 611-2, 611-3 and 611-4, n-gram tree 620 (2-gram or bigram) having a parent level 622 and child level 624, and term objects 631-635. Document vector 610 has a length of 16 terms and includes various occurrences of Terms 1, Term 2, Term 3, Term 4 and Term 5. Note that each term position in the document vector 610 has a corresponding offset value (located at the bottom of each box) with respect to the first term position of the vector.

In this particular configuration, parent node P1 corresponds to Term 1, parent node P2 corresponds to Term 2, parent node P3 corresponds to Term 3, parent node P4 corresponds to Term 4, and parent node P5 corresponds to Term 5. Likewise, child node C1 corresponds to Term 1, child node C2 corresponds to Term 2, child node C3 corresponds to Term 3, child node C4 corresponds to Term 4, and child node C5 corresponds to Term 5.

As shown in FIG. 6, each node also corresponds to an instantiation of its corresponding term object. For example, parent node P1 and child node C1 correspond to term object 631, parent node P2 and child node C2 correspond to term object 632, parent node P3 and child node C3 correspond to term object 633, parent node P4 and child node C4 correspond to term object 634, and parent node P5 and child node C5 correspond to term object 635. Recall that term objects contain information such as pointers to child nodes, frequency counters, offset values, etc., as previously discussed in reference to FIG. 5. In an alternative embodiment, note that the "term" objects don't contain pointers to nodes of the n-gram tree. Instead, nodes in the n-gram tree include pointers to the term objects.

It should be noted that in an alternate embodiment a separate object may be created (or instantiated) for each parent and/or child node in the n-gram tree 620.

During general operation, the sliding window 615 iteratively advances term-by-term along the document vector 610 from the starting position at 615-1 through the ending position at 615-4. For example, the sliding window advances from position 615-1 to position 615-2, and then advances to position 615-3, and so on, until the sliding window reaches position 615-4.

Referring specifically to sliding window position 615-1, the term analyzer 150 analyzes Term 1 since it occupies the first position indicated by sliding window 615 (e.g., the position having an offset value of 0). When analyzing Term 1 in the first position of window 615-1, the term analyzer 150 determines whether a parent node has already been created for this particular term. If so, then term analyzer 150 increments a frequency counter associated with the parent node in the respective term object for Term 1. On the other hand, if a parent node has not yet been generated, then term analyzer 150 creates a corresponding parent node (e.g., P1) in the parent level 622 of n-gram tree 620. This processing is iterated each time the sliding window 615 advances and a new term occupies the first position indicated by the sliding window's newly advanced position.

Still referring to sliding window position 615-1 in FIG. 6, the term analyzer 150 now analyzes Term 2 since it occupies the next position (or second position) indicated by the sliding window 615 (e.g., the position having an offset value of 1). Based on analyzing Term 2, the term analyzer 150 determines whether a child node has already been created for this particular term with respect to its parent node (e.g., P1). As discussed above, the parent node P1 include such as term representative of the term occupying the first position indicated by the sliding window 615. If it is determined that a child node has already been created (e.g., subordinate to P1), then term analyzer 150 increments a frequency counter associated with the child node of P1 in the respective term object for Term 2. Otherwise, the term analyzer 150 creates a new child node (e.g., C2) in the child level 624 of n-gram tree 620 for Term 2.

It should be pointed out that, for a sliding window of having a term width of 'n', the processing described above with respect to creation of child nodes and/or incrementing child node frequency counters is iterated for each subsequent n−1 terms after the first term indicated by the n-sized sliding window. As a result, the term analyzer 150 creates a hierarchical tree structure having n−1 child levels. In particular, a child node created by the term analyzer 150 for a given term is subordinate to a child node for the term immediately preceding the given term in the sliding window.

Note that the term objects associated with each parent and child node indicate a frequency count for the respective terms and phrases in document vector 610. For example, the count value associated with each parent node indicates how often the term associated with the parent node appears in the document vector 610. As previously discussed, the term frequency for individual terms at parent nodes indicates whether the singular term is useful as a keyword for representing the document vector 610 (and corresponding document).

The count value for each child node indicates how often a multi-term phrase is found in the document vector 610. For example, a count value associated with child node C2 under parent node P1 indicates how often the multi-term phrase including term 1 followed by term 2 appears in the document vector 610; a count value associated with child node C4 under parent node P1 indicates how often the multi-term phrase including term 1 followed by term 4 appears in the document vector 610; a count value associated with child node C3 under parent node P1 indicates how often the multi-term phrase including term 1 followed by term 3 appears in the document vector; a count value associated with child node C3 under parent node P2 indicates how often the multi-term phrase including term 2 followed by term 3 appears in the document vector; a count value associated with child node C5 under parent node P2 indicates how often the multi-term phrase including term 2 followed by term 5 appears in the document vector; a count value associated with child node C4 under parent node P3 indicates how often the multi-term phrase including term 3 followed by term 4 appears in the document vector; and so on.

Thus, the tree 620 can be useful for identifying occurrences of different combination of consecutive terms in appearing in the document as well as how often they appear in the document.

The single term occurring most frequently in the document vector 610 is Term 1, as indicated by the frequency counter in term object 631 associated with parent node P1. Likewise, the 2-gram (or bigram) phrase occurring most frequently in the document vector 610 is the phrase "Term 3-Term 1", as indicated by the frequency counter in term object 631 associated with child node C1 (from branch P3-C1 in n-gram tree 620).

The higher the count at a node in the child level, the more relevant a corresponding multi-term phrase is to representing the essence of the document under test.

A high term count for a parent node and a corresponding large number of children beneath the parent node indicates that a single term represented by the parent node occurs often in the document and would likely be useful as a keyword to describe the document.

Figure 7:
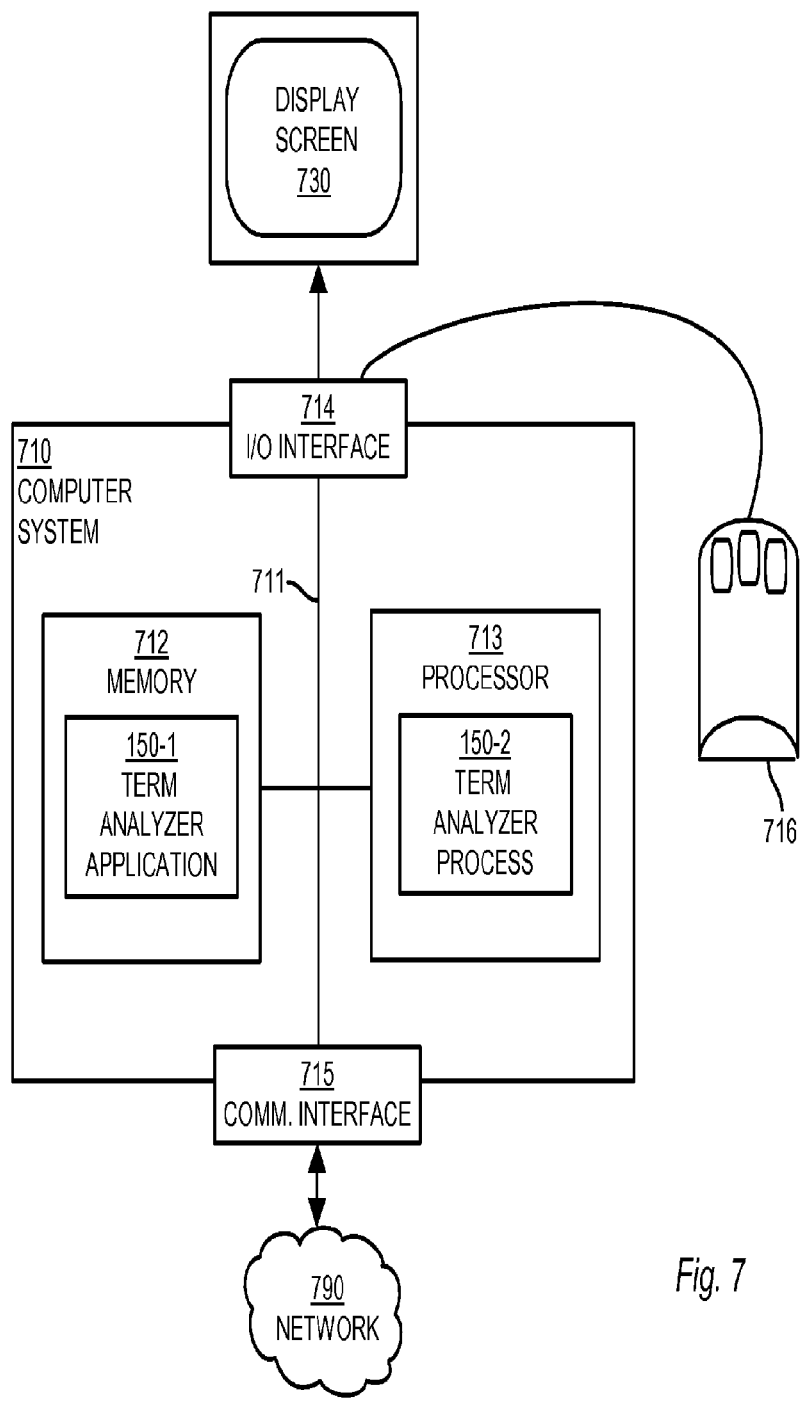
FIG. 7 is an example block diagram of a computer system configured with a term analyzer application and process according to embodiments herein.

FIG. 7 is a block diagram of an example architecture of a respective computer system 710 for implementing a term analyzer 150 (e.g., a term analyzer application 150-1 and/or term analyzer process 150-2) according to embodiments herein. Computer system 710 can be a computerized device such as a personal computer, workstation, portable computing device, console, network terminal, processing device, network device, etc.

Note that the following discussion provides a basic embodiment indicating how to carry out functionality associated with the term analyzer 150 as discussed above. However, it should be noted that the actual configuration for carrying out the term analyzer 150 can vary depending on a respective application. For example, the term analyzer application 150-1 can include instructions located and executed on multiple different computer systems or a single computer system.

As shown, computer system 710 of the present example includes an interconnect 711 that couples a memory system 712, a processor 713, I/O interface 714, and a communications interface 717.

I/O interface 714 provides connectivity to peripheral devices 716 (if such devices are present) such as a keyboard, mouse, display screen 730, etc. Communications interface 717 enables term analyzer 150 of computer system 710 to communicate over network 790 to request, retrieve, transmit, etc., various content for processing.

As shown, memory system 712 is encoded with term analyzer application 150-1 that supports functionality as discussed above and as discussed further below. Term analyzer application 150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor 713 accesses memory system 712 via the use of interconnect 711 in order to launch, run, execute, interpret or otherwise perform the logic instructions of the term analyzer application 150-1. Execution of the term analyzer application 150-1 produces processing functionality in term analyzer process 150-2. In other words, the term analyzer process 150-2 represents one or more portions of the term analyzer application 150-1 performing within or upon the processor 713 in the computer system 710.

It should be noted that, in addition to the term analyzer process 150-2 that carries out method operations as discussed herein, other embodiments herein include the term analyzer application 150-1 itself (i.e., the un-executed or non-performing logic instructions and/or data). The term analyzer application 150-1 may be stored on a computer readable medium (e.g., a repository) such as a floppy disk, hard disk or in an optical medium. According to other embodiments, the term analyzer application 150-1 can also be stored in a memory type system such as in firmware, read only memory (ROM), or, as in this example, as executable code within the memory system 712 (e.g., within Random Access Memory or RAM).

In addition to these embodiments, it should also be noted that other embodiments herein include the execution of the term analyzer application 150-1 in processor 713 as the term analyzer process 150-2. Thus, those skilled in the art will understand that the computer system 710 can include other processes and/or software and hardware components, such as an operating system that controls allocation and use of hardware resources.

Functionality supported by computer system 710 and, more particularly, functionality associated with term analyzer application 150-1 and term analyzer process 150-2 will now be discussed via flowcharts in FIGS. 8 through 12. For purposes of the following discussion, the term analyzer 150 (i.e., term analyzer application 150-1 and/or term analyzer process 150-2) or other appropriate entity in processing environments 100-600 generally performs steps in the flowcharts. Note that an ordering of steps is by way of example only and that the steps can be executed in any reasonable order to carry out the methods as described herein.

Note that there will be some overlap with respect to concepts discussed above for FIGS. 1 through 6. Also, note that the steps in the below flowcharts need not always be executed in the order shown.

Figure 8:
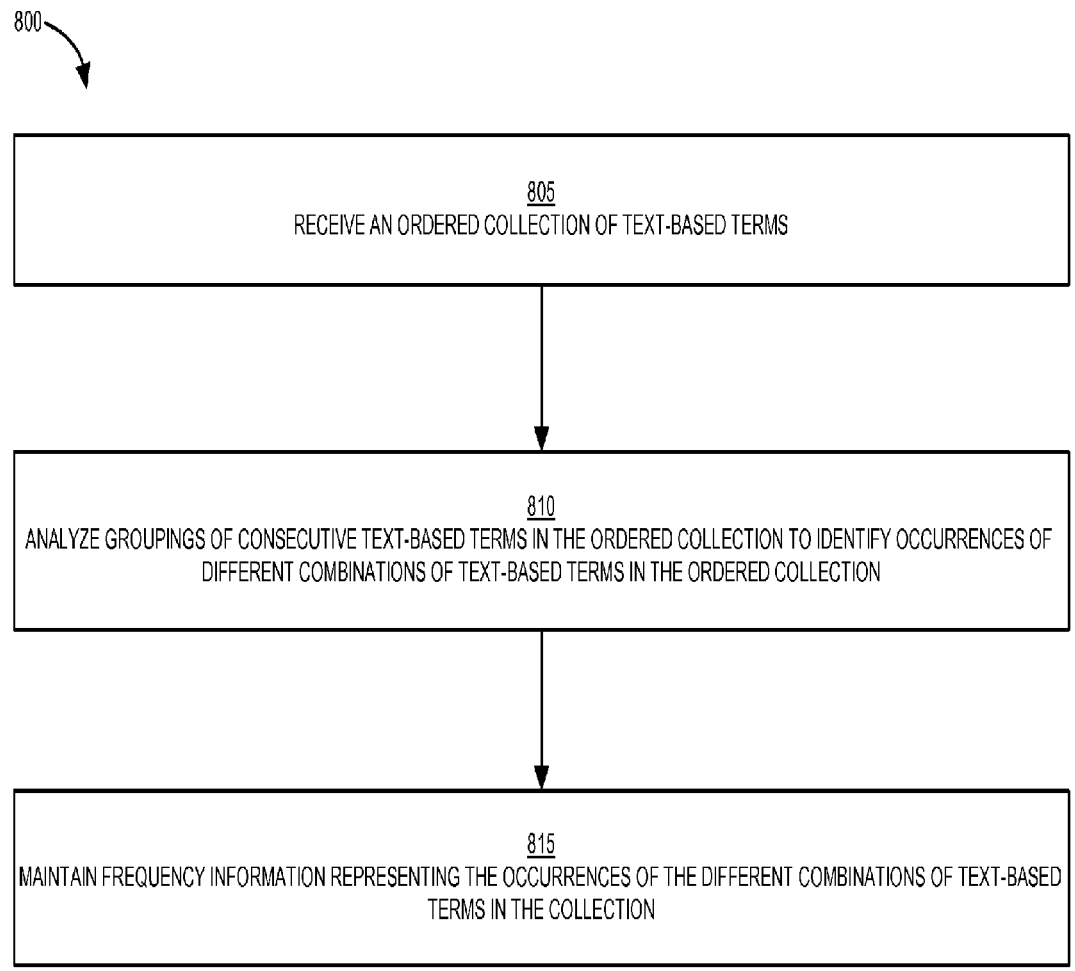
FIG. 8 is a flowchart illustrating an example of a method for analyzing terms and phrases in a document according to embodiments herein.

FIG. 8 is a flowchart 800 illustrating a technique of implementing a term analyzer and related functionality according to embodiments herein. Also, in addition to term analyzer 150, note that the steps in flowchart 800 can be performed by additional entities such as computer system 710, text extractor 220, pre-processor 230, term ranking algorithm 240, etc.

In step 805, the term analyzer 150 receives an ordered collection of text-based terms derived from a document (e.g., PDF document, hypertext markup language "HTML" file, or other similar word processing formats).

In step 810, the term analyzer 150 analyzes groupings of consecutive text-based terms in the ordered collection to identify occurrences of different combinations of text-based terms in the ordered collection.

In step 815, the term analyzer 150 maintains frequency information representing the occurrences of the different combinations of text-based terms in the collection.

Figure 9:
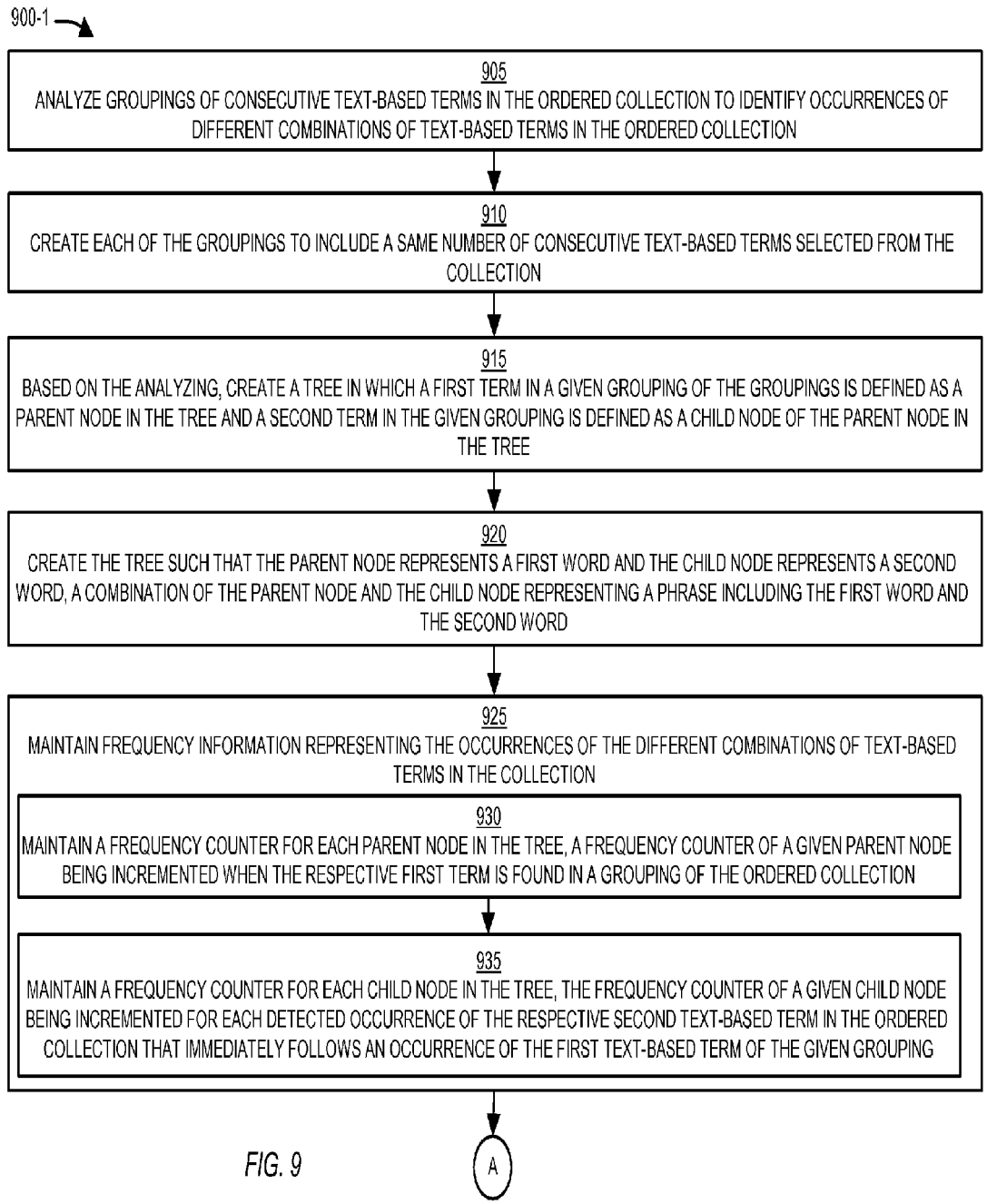
FIGS. 9 and 10 combine to form a flowchart illustrating an example of a method for analyzing terms and phrases in a document according to embodiments herein.
Figure 10:
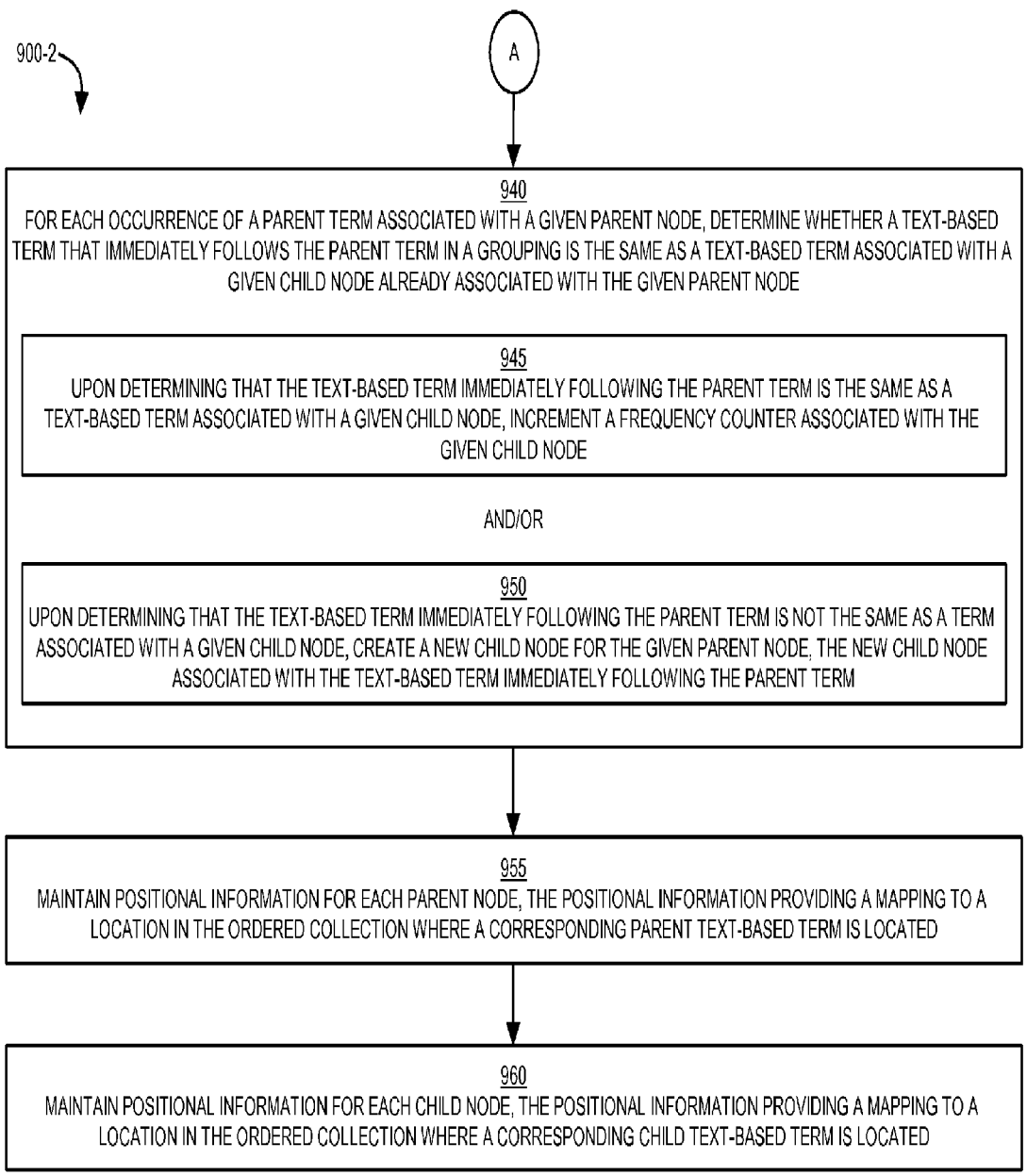

FIGS. 9 and 10 combine to form a flow chart 900 (e.g., flowchart 900-1, flowchart 900-2) of processing steps that shows processing operations performed by the term analyzer 150 in accordance with one example embodiment. Also, in addition to term analyzer 150, note that the steps in flowchart 800 can be performed by additional entities such as computer system 710, text extractor 220, pre-processor 230, term ranking algorithm 240, etc.

In step 905, the term analyzer 150 analyzes groupings of consecutive text-based terms in the ordered collection to identify occurrences of different combinations of text-based terms in the ordered collection.

In step 910, the term analyzer 150 creates each of the groupings to include a same number of consecutive text-based terms selected from the collection. The same number of consecutive text-based terms can be represented a sliding window having a fixed term width.

In step 915, based on the analyzing the ordered collection, the term analyzer 150 creates a tree in which a first term in a given grouping of the groupings is defined as a parent node in the tree and a second term in the given grouping is defined as a child node of the parent node in the tree. In other words, the term analyzer 150 generates a hierarchical tree such that parent nodes occupy a parent or primary level and child nodes occupy a subordinate or secondary level. Note that the tree can include multiple child level hierarchically configured with respect to the parent level depending on the size of the grouping of consecutive text-based terms (e.g., sliding window).

In step 920, the term analyzer 150 creates the tree such that the parent node represents a first word and the child node represents a second word. For example, a combination of the parent node and the child node represents a phrase including the first word and the second word.

In step 925, the term analyzer 150 maintains frequency information representing the occurrences of the different combinations of text-based terms in the collection In sub-step 930, the term analyzer 150 maintains a frequency counter for each parent node in the tree. The term analyzer 150 can increment the frequency counter for a given parent node when the respective first term is found in a grouping of the ordered collection.

In sub-step 935, the term analyzer 150 maintains a frequency counter for each child node in the tree. Similar to the parent node, the term analyzer 150 increments the frequency counter of a given child node for each detected occurrence of the respective second text-based term in the ordered collection that immediately follows an occurrence of the first text-based term of the given grouping.

In step 940, for each occurrence of a parent term associated with a given parent node, the term analyzer 150 determines whether a text-based term that immediately follows the parent term in a grouping is the same as a text-based term associated with a given child node already associated with the given parent node.

In sub-step 945, upon determining that the text-based term immediately following the parent term is the same as a text-based term associated with a given child node, the term analyzer 150 increments a frequency counter associated with the given child node.

In sub-step 950, upon determining that the text-based term immediately following the parent term is not the same as a term associated with a given child node, the term analyzer 150 creates a new child node for the given parent node. Accordingly, the new child node is associated with the text-based term immediately following the parent term.

In step 955, the term analyzer 150 maintains positional information for each parent node. The positional information (e.g., offset data, page numbers, etc.) provides a mapping to a location in the ordered collection where a corresponding parent text-based term is located.

In step 960, the term analyzer 150 maintains positional information for each child node. The positional information (e.g., offset data, page numbers, etc.) provides a mapping to a location in the ordered collection where a corresponding child text-based term is located.

According to an example embodiment, the ordered collection includes receiving a first text-based term, a second text-based term and a third text-based term. In this manner, the term analyzer 150 produces a first group including the first text-based term and the second text-based term. In addition, the term analyzer 150 produces a second group including the second text-based term and the third text-based term. The term analyzer 150 then analyzes the first group and the second group to identifying occurrences of single-word terms and multi-word terms in the ordered collection. In one embodiment, multi-word terms can include up to as many words as indicated by a value of the same number (e.g., size or term width of the sliding window).

The term analyzer 150 can further track a frequency of occurrence for different text-based terms in the collection having a common root (e.g., find stem terms). Each root terms is associated with at least one text-based term in the ordered collection having the respective root term in common.

Figure 11:
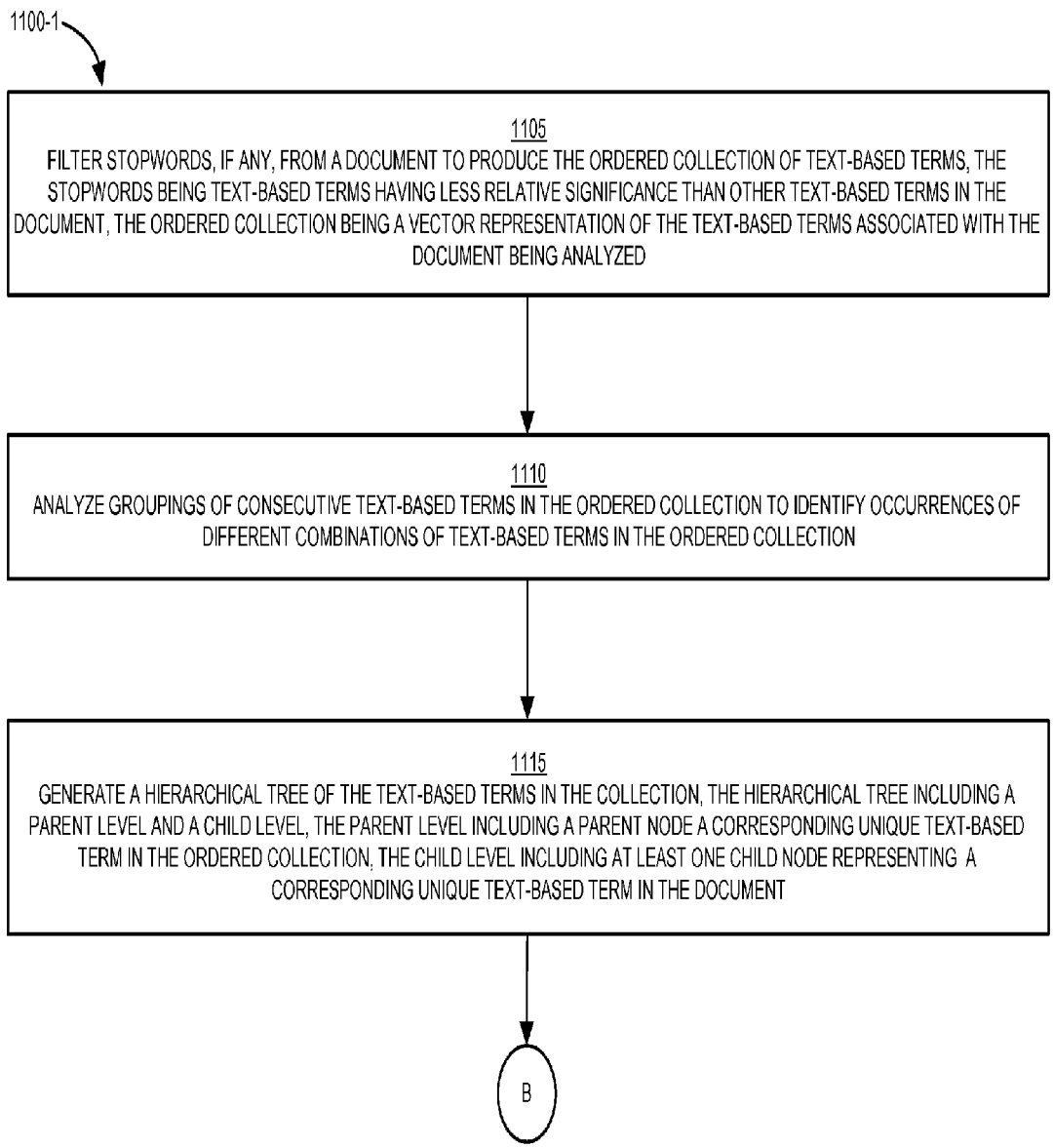
FIGS. 11 and 12 combine to form a flowchart illustrating an example of a method for analyzing terms and phrases in a document according to embodiments herein.
Figure 12:
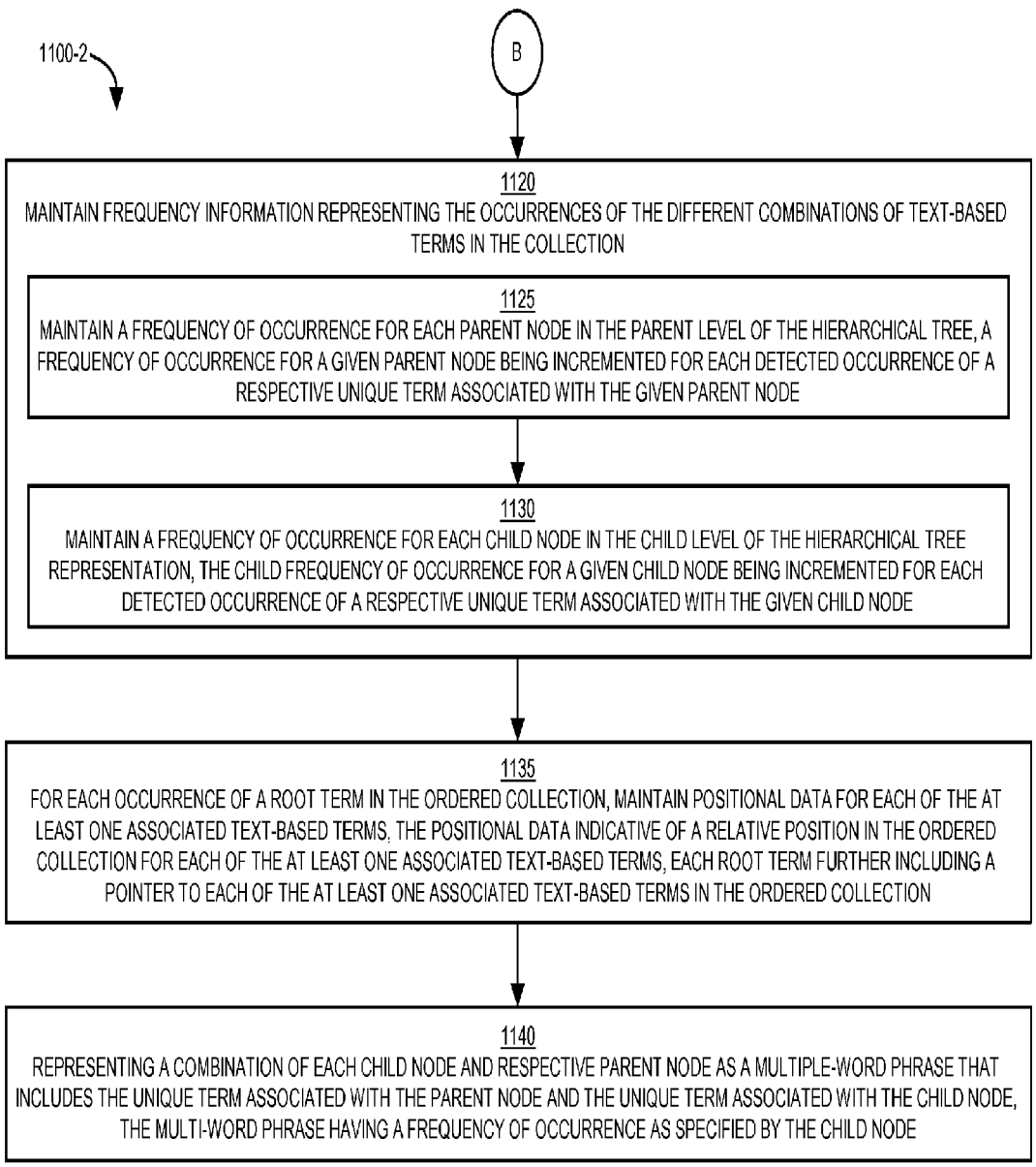

FIGS. 11 and 12 combine to form a flow chart 1100 (e.g., flowchart 1100-1, flowchart 1100-2) of processing steps that shows processing operations performed by the term analyzer 150 in accordance with one example embodiment. Also, in addition to term analyzer 150, note that the steps in flowchart 800 can be performed by additional entities such as computer system 710, text extractor 220, pre-processor 230, term ranking algorithm 240, etc.

In step 1105, the term analyzer 150 filters stopwords, if any, from a document to produce the ordered collection of text-based terms. As is commonly known in the art, stopwords are text-based terms having less relative significance than other text-based terms in a document (e.g., "the", "and", "for", etc.).

In one embodiment, the ordered collection is a vector representation of the text-based terms associated with the document being analyzed.

In step 1110, the term analyzer 150 analyzes groupings of consecutive text-based terms in the ordered collection to identify occurrences of different combinations of text-based terms in the ordered collection; and In step 1115, the term analyzer 150 generates a hierarchical tree of the text-based terms in the collection. The hierarchical tree includes a parent level and a child level. Additionally, the parent level includes a parent node representing a corresponding unique text-based term in the ordered collection. Likewise, the child level includes at least one child node representing a corresponding unique text-based term in the document.

In step 1120, the term analyzer 150 maintains frequency information representing the occurrences of the different combinations of text-based terms in the collection.

In sub-step 1125, the term analyzer 150 maintains a frequency of occurrence for each parent node in the parent level of the hierarchical tree. In one embodiment, the term analyzer 150 increments the frequency of occurrence for a given parent node for each detected occurrence of a respective unique term associated with the given parent node.

In sub-step 1130, the term analyzer 150 maintains a frequency of occurrence for each child node in the child level of the hierarchical tree. In an example configuration, the term analyzer 150 increments the child frequency of occurrence for a given child node for each detected occurrence of a respective unique term associated with the given child node.

In step 1135, for each occurrence of a root term (e.g., stem term) in the ordered collection, the term analyzer 150 maintains positional data for each of the associated text-based terms. For instance, the positional data can indicate a relative position (or offset) in the ordered collection for each of the associated text-based terms. Each root term can further include a pointer to each of the associated text-based terms in the ordered collection.

In step 1140, the term analyzer 150 represents a combination of each child node and respective parent node as a multiple-word phrase that includes the unique term associated with the parent node and the unique term associated with the child node. In such an instance, the multi-word phrase has a frequency of occurrence as specified by the child node.

According to an example embodiment, and in a document with text-based terms, the term analyzer 150 performs filtering to remove relatively less significant text-based terms from the document. Upon doing so, the term analyzer 150 identifies occurrences of phrases in the document that have at least one text-based term. In this example, the size of each phrase is limited to a predetermined number of text-based terms. Moreover, each phrase has associated positional data indicating a relative position of a given phrase in the document and/or a relative position of the given phrase with respect to a page of the document. The term analyzer 150 can then use the occurrences of phrases as a metric to determine, at least in part, a ranking of phrases having relative thematic significance in the document.

Note again that techniques herein are well suited for creating a novel word tree and analyzing documents to identify relevant single and multi-word phrases. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-readable storage medium having instructions stored thereon for processing data information, such that the instructions, when carried out by a processing device, enable a processing device to perform the operations comprising:
  receiving an ordered collection of text-based terms;
  analyzing groupings of consecutive text-based terms in the ordered collection to identify occurrences of different combinations of consecutive text-based terms in the ordered collection; and
  maintaining frequency information representing the occurrences of the different combinations of consecutive text-based terms in the collection.

2. The computer-readable storage medium of claim 1 wherein the operations further comprise using a sliding window to group the consecutive text-based terms.

3. The computer-readable storage medium of claim 1 wherein the operations further comprise, based on the analyzing, creating a tree in which a first term in a given grouping of the groupings is defined as a parent node in the tree and a second term in the given grouping is defined as a child node of the parent node in the tree, both the first term and the second term in the given grouping being consecutive text-based terms present in the order collection.

4. The computer-readable storage medium of claim 3 wherein the operations further comprise:
   creating a first grouping of the groupings to include a first word and a second word present in the ordered collection, the first word being consecutive with the second word in the ordered collection;
   based on analyzing the first grouping, creating a tree to include a first parent node and corresponding child node beneath the first parent node, the first parent node representing the first word, the child node beneath the first parent node representing the second word:
   creating a second grouping of the groupings to include the second word and a third word present in the ordered collection, the second word being consecutive with the third word in the ordered collection:
   based on analyzing the second grouping, creating the tree to include a second parent node and corresponding child node beneath the second parent node, the second parent node representing the second word, the child node beneath the second parent node representing the third word.

5. The computer-readable storage medium of claim 3 wherein the operations further comprise:
   maintaining a frequency counter for each parent node in the tree, a frequency counter of a given parent node being incremented when the first term is found in a grouping of the ordered collection; and
   maintaining a frequency counter for each child node in the tree, the frequency counter of a given child node being incremented for each detected occurrence of the second term in the ordered collection that immediately follows an occurrence of the first term.

6. The computer-readable storage medium of claim 5 wherein the operations further comprise:
   for each occurrence of a parent term associated with a given parent node, determining whether a text-based term that immediately follows the parent term in a grouping is the same as a text-based term associated with a given child node already associated with the given parent node; and:
   upon determining that the text-based term immediately following the parent term is the same as a text-based term associated with a given child node, incrementing a frequency counter associated with the given child node.

7. The computer-readable storage medium of claim 3 wherein the operations further comprise:
   maintaining positional information for each parent node in the tree, the positional information providing a mapping to a location in the ordered collection where a corresponding parent text-based term is located; and
   maintaining positional information for each child node in the tree, the positional information providing a mapping to a location in the ordered collection where a corresponding child text-based term is located.

8. The computer-readable storage medium of claim 3 wherein the operations further comprise:
   based on the analyzing, tracking a frequency of occurrence for different text-based terms in the collection having a common root, each of the root terms associated with at least one text-based term in the ordered collection having the respective root term in common.

9. The computer-readable storage medium of claim 8 wherein the operations further comprise:
   for each occurrence of a root term in the ordered collection, maintaining positional data for each of the at least one associated text-based terms, the positional data indicative of a relative position in the ordered collection for each of the at least one associated text-based terms, each root term further including a pointer to each of the at least one associated text-based terms in the ordered collection.

10. The computer-readable storage medium of claim 1 wherein the operations further comprise:
    creating each of the groupings to include a same number of consecutive text-based terms selected from the ordered collection; and
    based on the analyzing, identifying occurrences of single-word terms and multi-word terms in the ordered collection, the multi-word terms including up to as many words as indicated by a value of the same number.

11. The computer-readable storage medium of claim 1 wherein the operations further comprise:
    generating a hierarchical tree of the text-based terms in the collection, the hierarchical tree including a parent level and a child level, the parent level including a parent node representing a first unique text-based term in the ordered collection, the child level including at least one child node representing a second unique text-based term in the ordered collection document.

12. The computer-readable storage medium of claim 11 wherein the operations further comprise:
    maintaining a frequency of occurrence for each parent node in the parent level of the hierarchical tree, a frequency of occurrence for a given parent node being incremented for each detected occurrence of the first unique text-based term; and
    maintaining a frequency of occurrence for each child node in the child level of the hierarchical tree, the child frequency of occurrence for a given child node being incremented for each detected occurrence of the second unique text-based term.

13. The computer-readable storage medium of claim 11 wherein a combination of each child node and respective parent node represents a multiple-word phrase that includes the first unique text-based term and the second unique text-based term, the multi-word phrase having a frequency of occurrence as specified by the child node.

14. A method comprising:
    receiving a collection of text-based terms;
    analyzing groupings of consecutive text-based terms in the collection to identify occurrences of different combinations of text-based terms in the collection;
    based on the analyzing, creating a tree in which a first term in a given grouping of the groupings is defined as a parent node in the tree and a second term in the given grouping is defined as a child node of the parent node in the tree; and
    maintaining frequency information representing the occurrences of the different combinations of text-based terms in the collection.

15. The method of claim 14 further comprising creating the tree such that the parent node represents a first word and the child node represents a second word, a combination of the parent node and the child node representing a phrase including the first word and the second word.

16. The method of claim 14 further comprising creating each of the groupings to include a same number of consecutive text-based terms selected from the collection; and based on the analyzing, identifying occurrences of single-word terms and multi-word terms in the ordered collection, the multi-word terms including up to as many words as indicated by a value of the same number.

17. The method of claim 14 further comprising maintaining a frequency counter for each parent node in the tree, a frequency counter of a given parent node being incremented when the respective first term is found in a grouping of the ordered collection; and maintaining a frequency counter for each child node in the tree, the frequency counter of a given child node being incremented for each detected occurrence of the respective second text-based term in the ordered collection that immediately follows an occurrence of the first text-based term of the given grouping.

18. The method of claim 14 further comprising maintaining positional information for each parent node, the positional information providing a mapping to a location in the ordered collection where a corresponding parent text-based term is located; and maintaining positional information for each child node, the positional information providing a mapping to a location in the ordered collection where a corresponding child text-based term is located.

19. A computer system comprising:

a processor;

a memory unit that stores instructions associated with an application executed by the processor; and an interconnect coupling the processor and the memory unit, enabling the computer system to execute the application and perform operations comprising:

receiving an ordered collection of text-based terms;

analyzing groupings of consecutive text-based terms in the ordered collection to identify occurrences of different combinations of consecutive text-based terms in the ordered collection; and maintaining frequency information representing the occurrences of the different combinations of consecutive text-based terms in the collection.

20. The system of claim 19 wherein the operations further comprise using a sliding window to group the consecutive text-based terms.

* * * * *